A. QUANTIN.
Valve Gage for Bottles.

No. 10,158.

Patented Oct. 25, 1853.

Witnesses:

Inventor:

UNITED STATES PATENT OFFICE.

ALPHONSE QUANTIN, OF PHILADELPHIA, PENNSYLVANIA.

VALVE-GAGE FOR BOTTLES.

Specification of Letters Patent No. 10,158, dated October 25, 1853.

*To all whom it may concern:*

Be it known that I, ALPHONSE QUANTIN, of the city of Philadelphia, in the State of Pennsylvania, have invented a new and useful machine, being a gage for limiting the quantity of liquid to be taken at one time from a bottle or other reservoir; and I do hereby declare that the following is a full, clear, and exact description of the construction and operation of the same, reference being had to the annexed drawings, making a part of this specification, in which—

Figure 1:
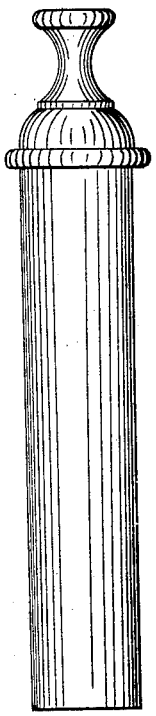
Figure 2:
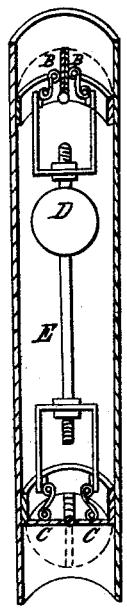
Figure 3:
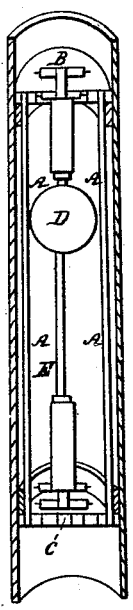
Figure 4:
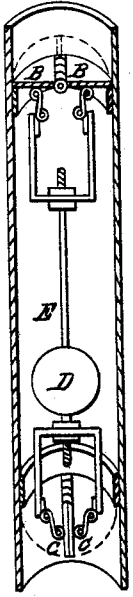
Figure 5:
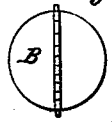
Figure 6:
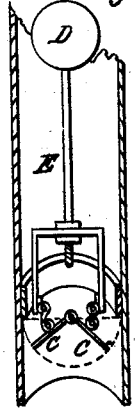

Figure 1 represents the exterior appearance of the gage; Fig. 2 represents the internal arrangement, with the lower valve closed and the upper valve open, as in the act of pouring out the liquid; Fig. 3, the same as Fig. 2, in a different position, showing the rods between which the ball or weight slides; Fig. 4, the same as Fig. 2, with the upper valve closed and the lower valve open as they will be when the bottle is in a perpendicular position; Fig. 5, the valve, and Fig. 6, the valve half or partially closed.

The upright frame of the gage may be made by two or more parallel rods, A, A, determining its length by their own and fixing its width by their distance apart. The dimensions of the gage may however be made in any other mode suitable to the proposed application of the instrument. At each end is affixed a valve, B, C, so adapted as that a ball, D, or other suitable weight will, by its fall or pressure in reversing or sufficiently inclining the vessel into which the gage is attached draw to or close the lower valve, C, (that through which the liquid enters into the gage) and also open the upper valve, B, through which the liquid within the gage (separated by the lower valve from that in the bottle or reservoir) is allowed to pass out. With the inclining of the bottle, the weight, D, shifts on the wire, E, which connects the valves so that, sinking in the gage while the bottle is standing, the lower valve, C, is thereby kept open and the top one, B, closed: if the bottle be reversed or inclined so as to pour out some of its contents, the liquid fills the gage and the ball, D, sliding along the connecting wire, E, by its weight throws open the upper as it closes the lower valve.

What I claim as my invention, and desire to secure by Letters Patent, is—

The above described machine or gage, with the arrangement of the valves as hereinbefore described one opening by the act of closing the other, so as to pour out of the vessel to which the gage is attached, only the quantity of liquid contained in the space between the two valves.

A. QUANTIN.

Witnesses:
JAS. F. MURRAY,
W. I. McELROY.